United States Patent Office 3,459,979
Patented Aug. 5, 1969

3,459,979
COOLING ARRANGEMENT FOR DAMPING WINDINGS OF DYNAMO-ELECTRIC MACHINES
Clifford James Dickinson, Hillside, Rugby, and Noel John Carew, Rugby, England, assignors to Associated Electrical Industries, Limited, London, England, a British company
Filed Apr. 26, 1967, Ser. No. 633,734
Claims priority, application Great Britain, May 11, 1966, 20,965/66
Int. Cl. H02k 9/00, 9/20, 1/10
U.S. Cl. 310—54                     10 Claims

ABSTRACT OF THE DISCLOSURE

In a dynamo-electric machine a damper winding on the salient poles of the rotor of the machine is provided with ducts through which a cooling fluid is caused to flow. Header boxes which supply and collect the cooling fluid are of electrically conductive material and adapted to form end rings of the damper winding.

Background of the invention

This invention relates to dynamo-electric machines and is particularly concerned with dynamo-electric machines having salient poles which are provided with a damper winding.

For certain applications and under certain conditions of load the damper winding provided on the salient poles of a dynamo-electric machine is called upon to carry relatively large currents which can cause the temperature of the damper winding to increase. The normal methods of dissipating heat to enable the temperature of the damper winding to be kept at an acceptable value is by conduction into adjacent pole iron which acts as a heat sink and has a relatively large heat-radiating surface, and by convection and radiation into a stream of air passing over the exposed surfaces of the bars forming the damper windings.

An object of the invention is to provide an improved cooling arrangement for the damper winding of a dynamo-electric machine.

Summary of the invention

According to the present invention the damper winding on the salient poles of a dynamo-electric machine is provided with ducts through which a cooling fluid can flow to effect cooling of the damper winding.

Preferably the damper bars of the damper winding are formed by metal tubes which communicate with header boxes supported by or closed to the pole tip overhang at each end of the salient poles. The header boxes, which provide means for supplying the cooling fluid to and collecting the cooling fluid from the damper winding tubes, can be of electrically conductive material and be adapted to form the end ring connections which usually connect together the ends of the damper bars at each end of the damper winding.

The cooling fluid can be supplied to and discharged from the ducts at the same end of the salient poles, or can be supplied to the ducts at one end of the salient poles and discharged from ducts at the other end of the salient poles. The cooling fluid may be arranged to flow in a closed circuit which includes a heat exchanger arranged to extract heat from the cooling fluid.

The tubes forming the damper bars can be of any suitable metal and can have a cross-sectional shape to suit the electromagnetic design of the dynamo-electric machine.

Brief description of the drawings

The invention will now be described, by way of example, with reference to the accompanying drawings in which.

Description of the preferred embodiments

Figure 1:
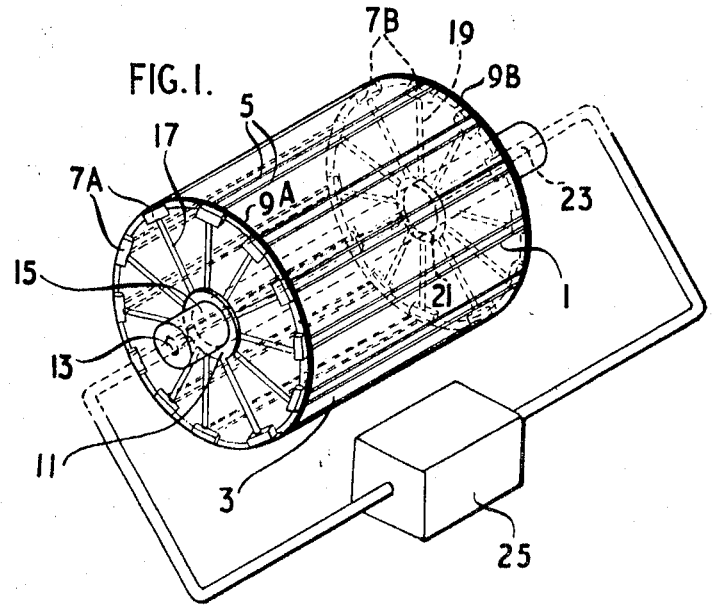
FIGURE 1 is a diagrammatic perspective view of a rotor of a dynamo-electric machine having a damper winding in accordance with the invention.

Referring in the first instance to FIGURE 1, a damper winding 1 of the salient poles of a rotor 3 of a dynamo-electrical machine has a plurality of damper bars 5 formed by metal tubes which extend between header boxes 7A supported at or close to the pole tip overhang at one end of the salient poles and header boxes 7B supported at or close to the pole tip overhang at the other end of the salient poles. The header boxes 7A are of a suitable metal and are connected together by electrical conductors 9A to form the end ring at one end of the damper winding 3, and the header boxes 7B which are also of a suitable metal, are connected together by electrical conductors 9B to form the end ring at the other end of the damper winding. An inlet manifold 11 at one end of the rotor is arranged to be supplied with cooling fluid through a bore 13 in the rotor shaft 15 and is connected to the header boxes 7A by a plurality or radially disposed pipes 17. A further plurality of radially disposed pipes 19 connects the header boxes 7B to an outlet manifold 21 arranged to discharge cooling fluid through a bore 23 in the rotor shaft 15. The cooling fluid which can be admitted to the bore 13 and discharged from the bore 23 through suitable seals on the shaft, may be either discharged to waste or recirculated to the inlet manifold 11, through a heat exchanger 25 arranged to extract heat from the cooling fluid. Cooling of the conductors 9A and 9B, through which the cooling fluid does not pass, is effected by conduction to the header boxes 7A and 7B and by convection to the surrounding atmosphere.

Figure 4:
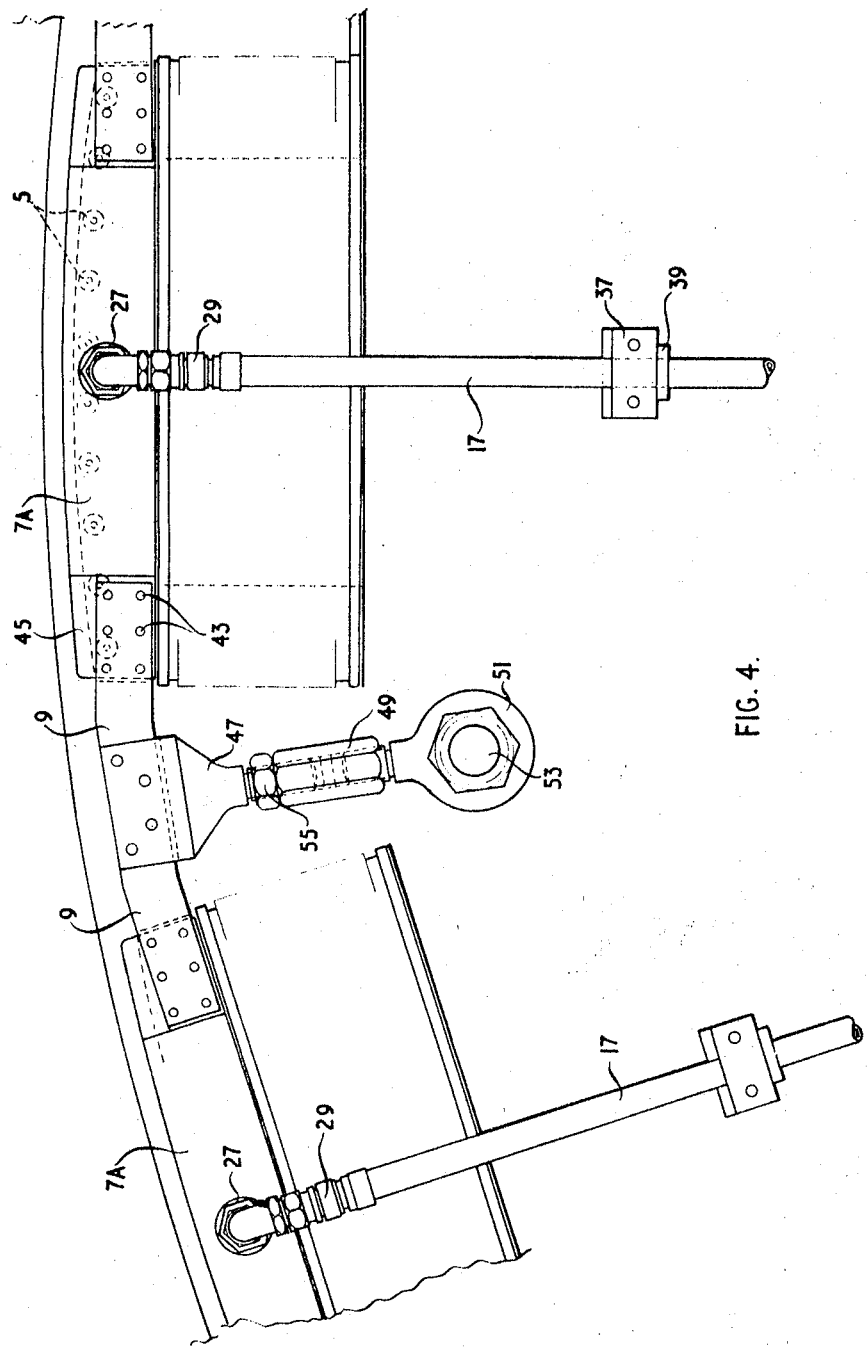
FIGURE 4 is a fragmentary end elevation of a rotor of a dynamo-electric machine having a damper winding of the form shown in FIGURE 1.
Figure 5:
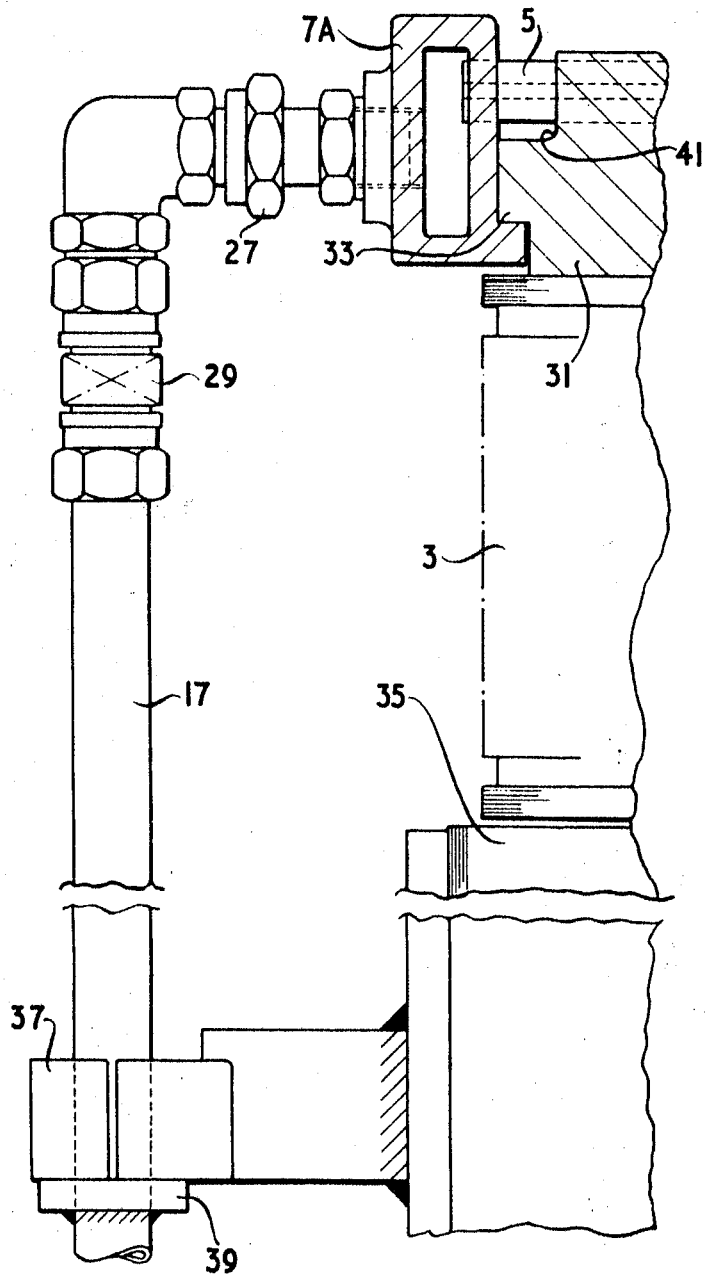
FIGURE 5 is a fragmentary side elevation, partly in section, of the rotor shown in FIGURE 4.

Referring now to FIGURES 4 and 5 which illustrate a practical embodiment of the rotor shown diagrammatically in FIGURE 1, the radially disposed pipes 17 are connected to the header boxes 7A by hydraulic compression fittings 27, and a bellows coupling 29 inserted between each radial pipe 17 and the compression fitting 27 is arranged to permit limited radial movement of the header box 7A and the pole tip overhang 31. The bellows coupling is also arranged to have sufficient flexibility to cater for movement of the header box on a spigot 33 on which it is mounted in a direction axially of the rotor 3, caused by differential thermal expansion of the damper bars 5 relative to the salient pole of the rotor in which they are accommodated. Each radial pipe 17 is clamped to the magnet wheel 35 of the rotor 3 by a split clamp arrangement 37 located on a collar 39 and arranged to simplify assembly and dismantling. The hollow damper bars 5 are brazed or welded into the header boxes 7, a recess 41 being provided in the pole tip overhang 31 to facilitate the welding operation. The conductors 9 forming the interpolar end ring consist of a number of strips of rectangular cross-section of a metal compatible with that of the header boxes 7, secured to the header boxes by screws 43. A flange 45 is provided on each header box 7 to help react the centrifugal force developed in the conductors 9 during rotation of the rotor 3 in use. The conductors 9 from two adjacent header boxes 7 are interleaved and secured in a clevis 47 which is attached to the magnet wheel 35 by an adjustable nut 49 screwed onto an eyebolt 51 which is secured to the magnet wheel 35 by a through bolt 53 arranged to permit movement of the assembly along the axis of the salient poles. The adjustable nut 49 permits tension in the assembly to be adjusted and a locknut 55 is provided to permit the assembly to be locked in a desired position. A similar arrangement of pipes, header boxes and conductors at the other end of the rotor 3 is arranged to discharge cooling fluid into the outlet manifold and to form the other end ring of the damper winding.

Figure 6:
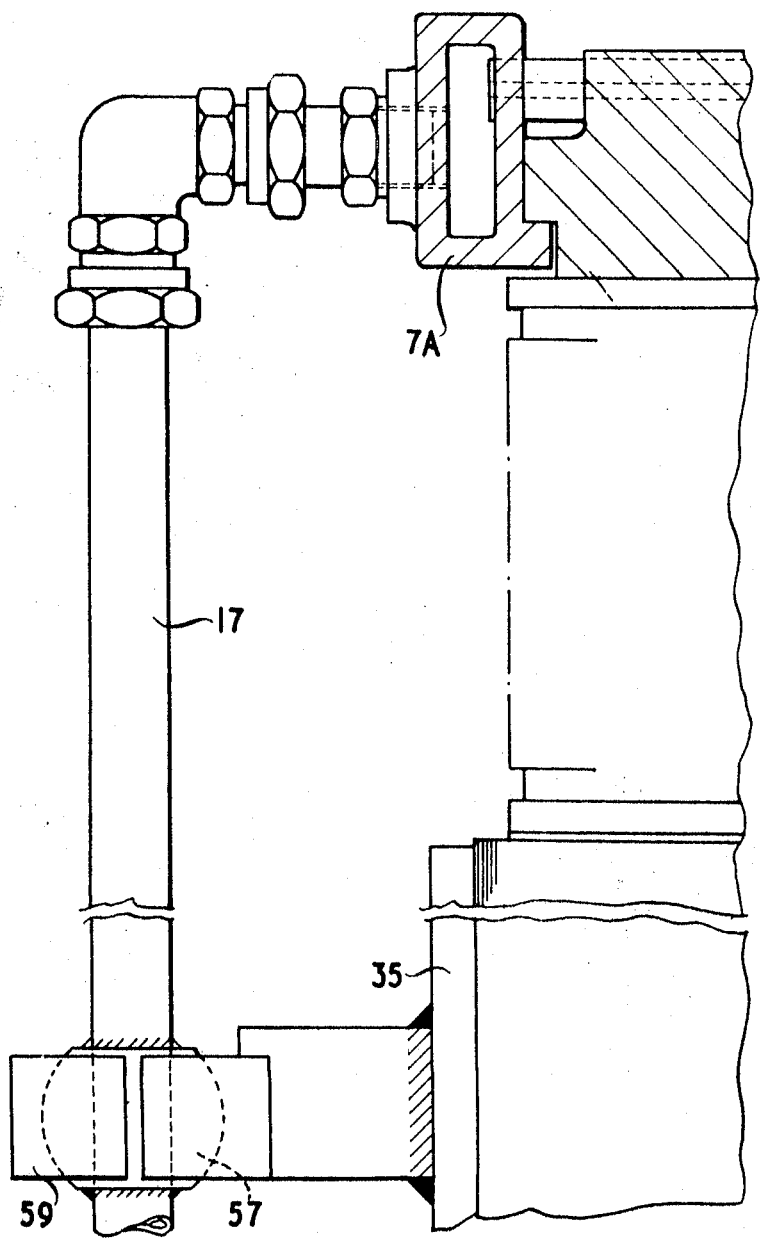
FIGURE 6 is a fragmentary side elevation similar to FIGURE 5 but having a modified form of mounting arrangement for the radially disposed pipes shown in that figure.

Referring now to FIGURE 6 which shows an alternative mounting arrangement for the radially disposed pipes 17 shown in FIGURES 4 and 5, each pipe 17 has dimensions such that the pipe produces the same strain relationship as that which exists between the pole and magnet wheel 35. The radial pipe 17 has spherical seating 57 and is secured to the magnet wheel 35 by a spherical split clamp 59, the seating 57 being arranged to permit the radial pipe to adjust to any position required by the axial movement of the header box 7A.

Figure 7A:
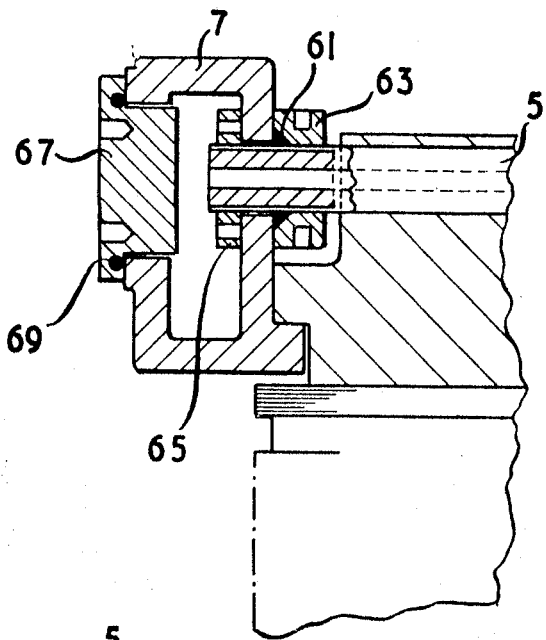
FIGURES 7A and 7B are fragmentary side elevations of header boxes similar to those shown in FIGURES 5 and 6 but having the damper bar tubes connected thereto in a different manner.
Figure 7B:
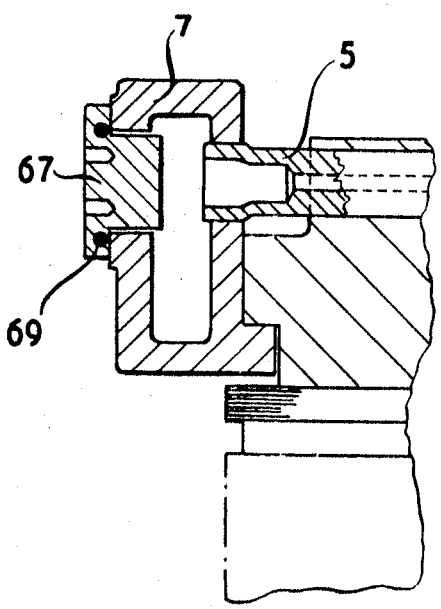

The hollow damper bars 5 need not be brazed or welded to the header boxes 7 and as shown in FIGURE 7A, the damper bars 5 can be threaded at each end and sealing rings 61 and nuts 63 and 65 arranged to secure the bars 5 mechanically against leakage of the cooling fluid and also to provide an electrical connection of good conductivity between the damper bars 5 and the header boxes 7. Alternatively, as shown in FIGURE 7B, the damper bars 5 can be expanded into the header boxes 7. In each case access holes can be provided in the header boxes and be sealed with plugs 67 fitted with sealing rings 69.

Figure 2:
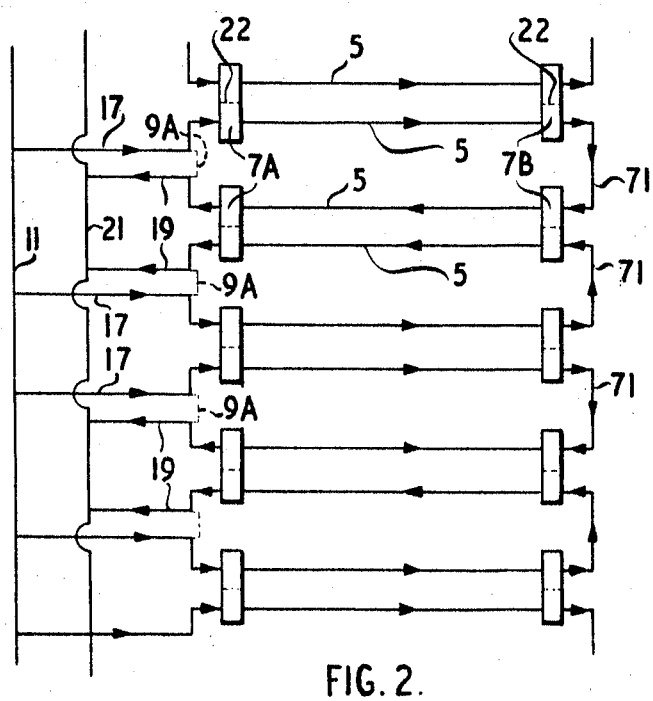
FIGURES 2 and 3 are schematic representations of modified forms of the damper winding shown in FIGURE 1.

It may be desirable to supply and discharge the cooling fluid at the same end of the dynamo-electric machine and an arrangement providing this facility is illustrated schematically in FIGURE 2. In this arrangement the inlet manifold 11, outlet manifold 21, and the radial pipes 17 and 19 are provided at the same end of the rotor, the cooling fluid being supplied and discharged through suitable bores in the rotor shaft. Header boxes 7A and 7B are provided at opposite ends of the salient poles of the rotor at or close to the pole tip overhang and a plurality of damper bars 5 formed by metal tubes extend between each header box 7A and an associated header box 7B. The inlet manifold 11 is connected to alternate header boxes 7A around the periphery of the rotor at one end of the salient poles through radial pipes 17 and is returned through the remainder of the header boxes 7A. Conductors 9A connect together the header boxes 7A and form therewith the end ring at that end of the damper winding. Each header box 7B at the other end of the rotor is connected to the adjacent header boxes at each side of it by metal tubes 71 which form the end ring at that end of the damper winding. Thus as indicated by the arrows in the figure, the cooling fluid flows in opposite directions through the damper bars 5 of two adjacent salient poles. Each header box, 7A and 7B, is divided into two separate compartments by a central baffle 22.

Figure 8:
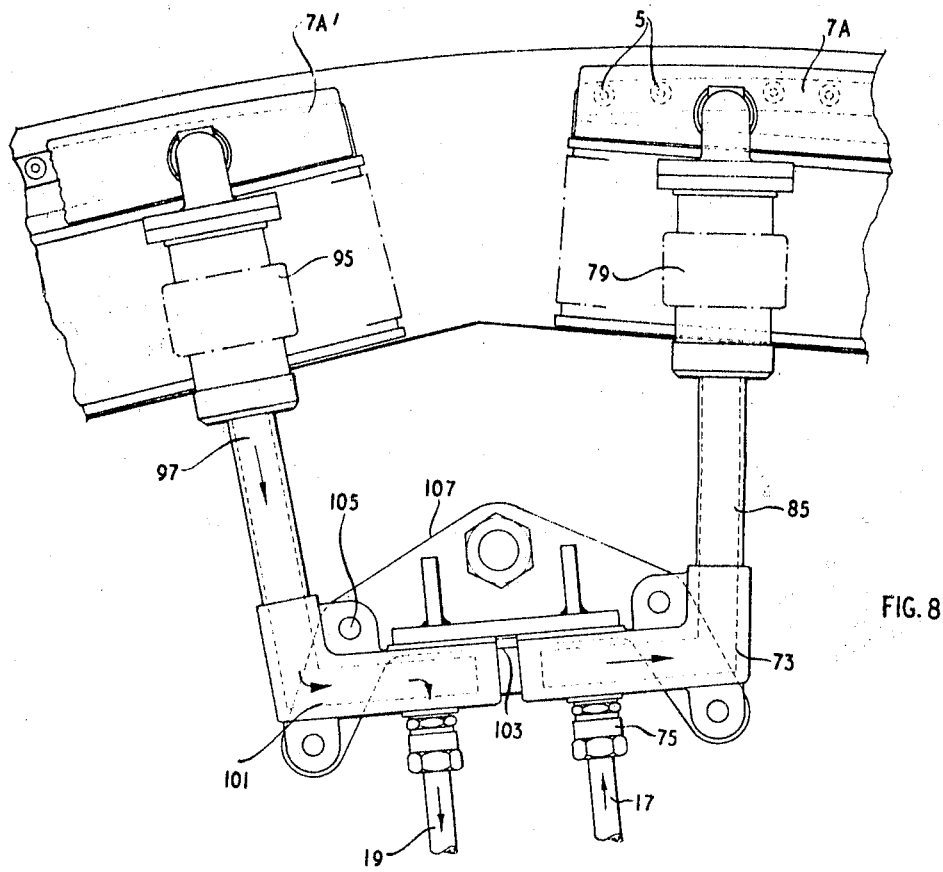
FIGURE 8 is a fragmentary end elevation of a rotor of a dynamo-electric machine having a damper winding of the form represented in FIGURE 2.
Figure 9:
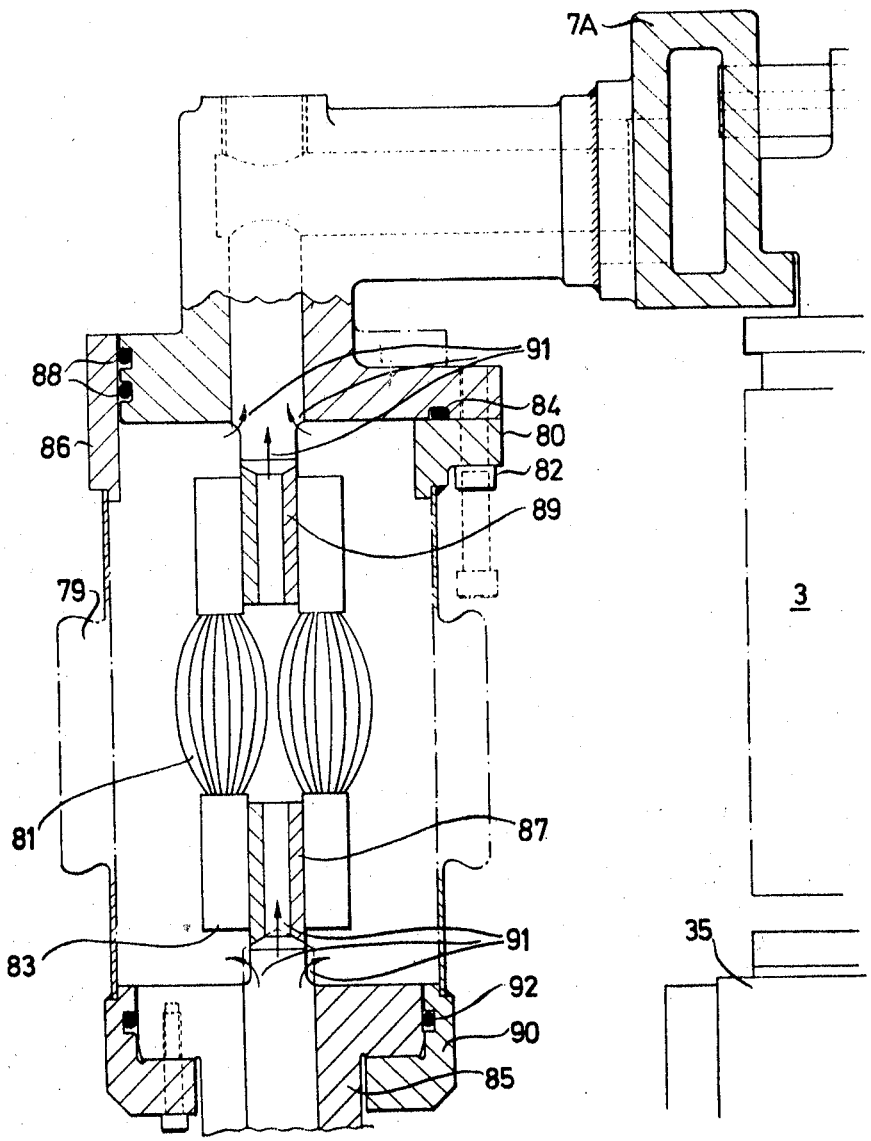
FIGURE 9 is a fragmentary side elevation, partly in section, of the rotor shown in FIGURE 8.

Referring now to FIGURES 8 and 9 which illustrate a practical embodiment of the rotor shown schematically in FIGURE 2 the radially disposed pipes 17 from the inlet manifold are connected to a header box 7A by way of a hydraulic compression fitting 75, an inlet elbow 73, a connecting pipe 85 and a bellows coupling 79. An electrical connection 81 to the header box 7A is incorporated in the bellows coupling 79 as will be seen from FIGURE 9. This electrical connection 81 comprises a number of flexible braided straps which have their ends cold swaged into ferrules 83 secured to space terminals 87 and 89 formed on the connecting pipe 85 and the header box 7A respectively. Internal passages in the connecting pipe 85 and header box 7A allow circulation of the cooling fluid as indicated by the arrows 91. The incorporation of the flexible connection 81 in the bellows coupling 79 allows the braided straps forming the connection to be cooled by the fluid and also provides mechanical flexibility between the header box 7A and the magnet wheel 35 of the rotor 3. The cooling fluid discharged from the the damper windings 5 flows into an adjacent header box 7A' and through a bellows coupling 95, connecting pipe 97, outlet elbow 101 and radially disposed outlet pipe 19 similar to these described for the inlet of cooling fluid. The end ring connection for the damper winding is provided by a plug 103 which connects together elbows 73 and 101. The pipes 17 and 19, elbows 73 and 101 and plug 103 are secured by screws 105 to a plate 107 which is itself spigotted on to the end of the magnet wheel 35.

The attachment flanges to the header boxes, 7A and 7B can take a number of forms of which two are shown in FIGURE 9. The right hand side of FIGURE 9 shows the upper end of the bellows 79 welded to a steel flange 80 and fastened to the header box 7A by screws 82 with an O-ring seal 84 to prevent leakage. An alternative scheme is shown on the left hand side of FIGURE 9 in which the bellows 79 is welded to a collar 86 with two O-ring seals 88 in series to contain the fluid. In both cases the other end of the bellows 79 is welded to a flange 90 with O-ring seal 92 preventing leakage.

Figure 3:
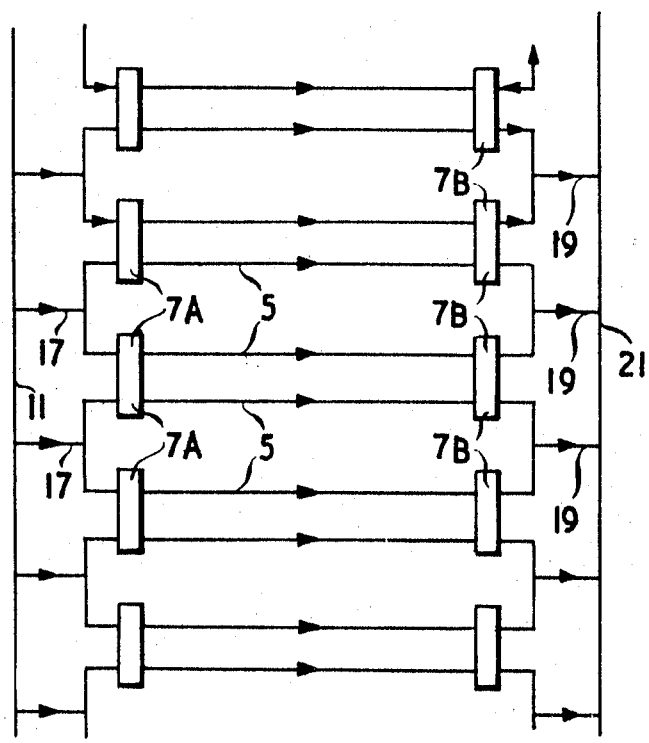

In some applications of the invention it may be desirable to cool with the cooling fluid the end ring connections of the damper winding 1, and an arrangement providing this facility is illustrated schematically in FIGURE 3. In this arrangement the inlet manifold 11 and outlet manifold 21 are at opposite ends of the rotor as in FIGURE 1, but in this case each radially disposed pipe 17 is bifurcated and feeds two adjacent header boxes 7A so that one radially disposed pipe 17 supplies cooling fluid to half the damper bars 5 of two adjacent salient poles. Likewise, each radially disposed pipe 19 at the other end of the rotor 3 is bifurcated and collects cooling fluid from two adjacent header boxes 7B so that one radially disposed pipe collects cooling fluid from half the damper bars 5 of two adjacent salient poles. Thus the bifurcated pipes 17 and 19 and their associated header boxes 7A and 7B respectively form the end rings of the damper winding 1.

Figure 10:
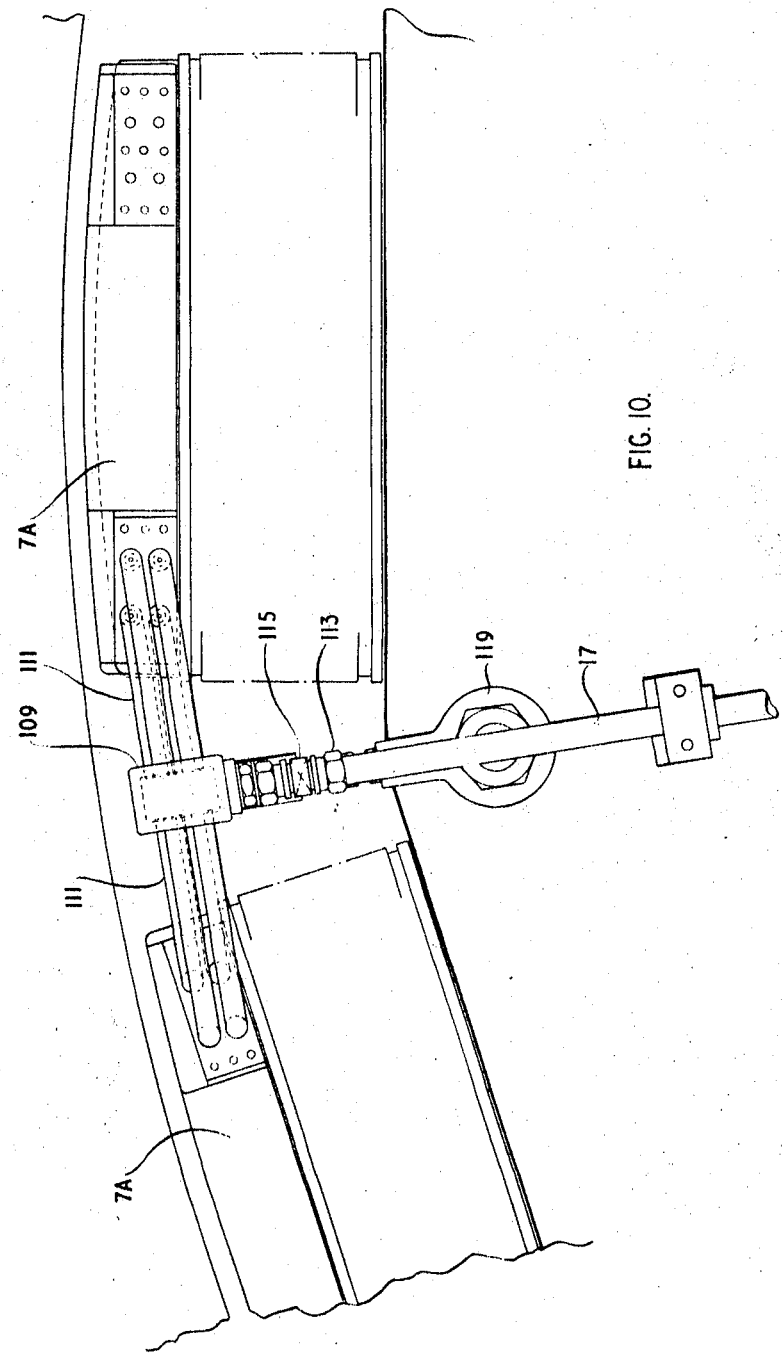
FIGURE 10 is a fragmentary end elevation of a rotor of a dynamo-electric machine having a damper winding of the form represented in FIGURE 3.
Figure 11:
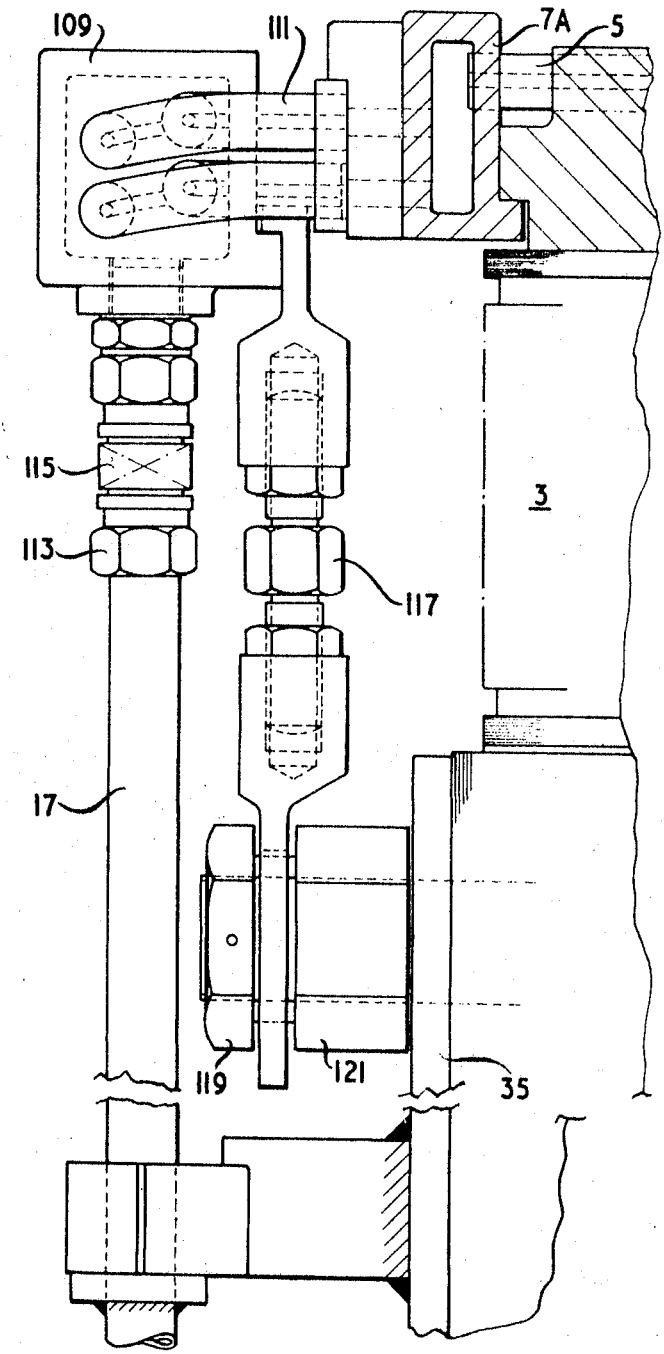
FIGURE 11 is a fragmentary side elevation, partly in section, of the rotor shown in FIGURE 10.

Referring now to FIGURES 10 and 11 which illustrate a practical embodiment of the rotor shown schematically in FIGURE 3, the header boxes 7A of two adjacent salient poles are connected to a further header box 109 by a plurality of tubes 111. These tubes 111 together with header boxes 7A and header boxes 109 form an end ring of the damper winding. The number and size of the tubes 111 will be determined by the number and size of the damper bar tubes 5 to be supplied with cooling fluid and the required interconnecting cross-sectional area. The header box 109 is supplied with cooling fluid through a radially disposed pipe 17 connected to the inlet manifold (not shown) a hydraulic compression fitting 113 and a bellows coupling 115 being provided to provide the necessary flexibility. The header box 109 is restrained against centrifugal forces developed in use of the rotor 3 by a turnbuckle 117 having one end hooked onto the header box 109 and the other end formed into an anchor ring 119 and fitted over a spigot 121 on the magnet wheel 35 of the rotor 1. A similar arrangement of header boxes such as 109 and tubes such as 111 at the other end of the rotor arranged to discharge cooling fluid into the outlet manifold and also forms the other end ring of the damper winding.

We claim:
1. A dynamo-electric machine including:
    (a) a rotor having salient poles;
    (b) damper bars located on the salient poles;
    (c) ducts located in the damper bars through which a cooling fluid can be circulated;
    (d) header boxes of electrically conductive material at the ends of the salient poles for circulating the cooling fluid through the ducts in the damper bars; and
    (e) electrical conductors interconnecting the header boxes to form end rings, said end rings connecting together the damper bars to form a damper winding.

2. A dynamo-electric machine as claimed in claim 1, wherein the damper bars comprise metal tubes through which the cooling fluid can flow, said tubes extending between header boxes supported by pole tip overhangs at ends of the salient poles.

3. A dynamo-electric machine as claimed in claim 1, further comprising means for supplying the cooling fluid to the header boxes at one end of the salient poles and means for discharging the cooling fluid from the header boxes at the other end of the salient poles.

4. A dynamo-electric machine as claimed in claim 1, further comprising an inlet manifold at one end of the rotor for receiving cooling fluid through a bore in a rotor shaft, a plurality of radially disposed pipes for connecting the inlet manifold to the header boxes for the supply of cooling fluid thereto, an outlet manifold at the other end of the rotor for discharging cooling fluid through a further bore in the rotor shaft, and a further plurality of radially disposed pipes for connecting the outlet manifold to the header boxes to receive cooling fluid therefrom.

5. A dynamo-electric machine as claimed in claim 4, wherein each radially disposed pipe of the first mentioned plurality is connected to two adjacent header boxes so that each said radially disposed pipe of said plurality supplies cooling fluid from damper bars on two adjacent salient poles and each radially disposed pipe of the further plurality is connected to two adjacent header boxes so that each said radially disposed pipe of said second plurality receives cooling fluid from damper bars on two adjacent salient poles.

6. A dynamo-electric machine as claimed in claim 4, further comprising hydraulic compression fittings for connecting the radially disposed pipes to the header boxes and a bellows coupling connected between each radially disposed pipe and the compression fitting associated therewith for permitting limited radial movement of the header box.

7. A dynamo-electric machine as claimed in claim 1, further comprising means for supplying and discharging the cooling fluid from the header boxes at one end of the salient poles.

8. A dynamo-electric machine as claimed in claim 1, further comprising an inlet manifold and an outlet manifold at one end of the rotor, a plurality of radially disposed pipes for connecting the inlet manifold to alternate header boxes around the periphery of the rotor at said one end for the supply of cooling fluid thereto, and a further plurality of radially disposed pipes for connecting the other header boxes at said one end of the rotor to the outlet manifold, each header box at the other end of the rotor being connected to one adjacent header box so that cooling fluid flows in opposite directions through the ducts in the damper bars on two adjacent salient poles.

9. A dynamo-electric machine as claimed in claim 8, further comprising hydraulic compression fittings for connecting the radially disposed pipes to the header boxes and a bellows coupling connected between each radially disposed pipe and the compression fitting associated therewith for permitting limited radial movement of the header box.

10. A dynamo-electric machine as claimed in claim 1, further comprising means for connecting the ducts and header boxes in a closed hydraulic circuit, said circuit including a heat exchanger for extracting heat from the cooling fluid.

References Cited

UNITED STATES PATENTS 3,184,624 5/1965 Solomon _____ 310—59
3,185,872 5/1965 Weissheimer _____ 310—64
3,239,703 3/1966 Long _____ 310—183

MILTON O. HIRSHFIELD, Primary Examiner

R. SKUDY, Assistant Examiner

U.S. Cl. X.R.
310—183, 269